(12) United States Patent
Dios

(10) Patent No.: US 11,458,432 B2
(45) Date of Patent: Oct. 4, 2022

(54) RECHARGEABLE DEHUMIDIFIER

(71) Applicant: HUMEX, S.A., La Canonja (ES)

(72) Inventor: Eva Schmidt Dios, La Canonja (ES)

(73) Assignee: HUMEX, S.A., La Canonja (ES)

( * ) Notice: Subject to any disclaimer, the term of this patent is extended or adjusted under 35 U.S.C. 154(b) by 387 days.

(21) Appl. No.: 16/333,790

(22) PCT Filed: Nov. 17, 2016

(86) PCT No.: PCT/ES2016/070820
§ 371 (c)(1),
(2) Date: Mar. 15, 2019

(87) PCT Pub. No.: WO2018/091751
PCT Pub. Date: May 24, 2018

(65) Prior Publication Data
US 2019/0232213 A1 Aug. 1, 2019

(51) Int. Cl.
*B01D 53/04* (2006.01)
*B01D 53/26* (2006.01)
*F24F 3/14* (2006.01)
*F24F 13/20* (2006.01)

(52) U.S. Cl.
CPC ....... *B01D 53/0415* (2013.01); *B01D 53/261* (2013.01); *B01D 53/263* (2013.01); *F24F 3/1411* (2013.01); *F24F 13/20* (2013.01); *B01D 2257/80* (2013.01); *F24F 2003/144* (2013.01)

(58) Field of Classification Search
CPC .... B01D 53/04; B01D 53/26; B01D 53/0415; B01D 53/261; B01D 53/263; F24F 3/1141; F24F 13/20; F24F 2003/144
See application file for complete search history.

(56) References Cited

U.S. PATENT DOCUMENTS

2016/0273789 A1* 9/2016 Gwen .................... B65D 47/32

FOREIGN PATENT DOCUMENTS

| EP | 2 275 749 A1 * | 10/2009 | ............... F24F 3/14 |
| EP | 2275749 A1 | 1/2011 | |
| ES | 1 039 679 U * | 3/1998 | ............ B65D 85/84 |
| ES | 1039679 U | 1/1999 | |
| JP | H0957045 A * | 3/1997 | ............ B01D 53/26 |

(Continued)

OTHER PUBLICATIONS

ES 1 039 679 U_English (Year: 1998).*

(Continued)

*Primary Examiner* — Youngsul Jeong
(74) *Attorney, Agent, or Firm* — Banner & Witcoff, Ltd.

(57) ABSTRACT

Rechargeable dehumidifier including inside it the components it consists of, with the possibility that none of them project outward so that it can have an outward appearance without projections, as well as being simple to manufacture, comprising a casing with at least one first opening and open on the top, which configures a first internal cavity, a first lid arranged on top of the casing, provided in the first cavity with a container that in turn comprises a body open on the top that configures a second cavity, a second lid provided on top of the body and having at least one second opening; on top of the second lid may be provided a desiccant agent such that the water absorbed by it is collected in the body when it falls by gravity.

14 Claims, 4 Drawing Sheets

(56) References Cited

FOREIGN PATENT DOCUMENTS

| JP | H0957045 A | | 3/1997 | | |
| JP | 2001206429 | * | 7/2001 | ............ | B65D 51/30 |
| JP | 2001206429 A | | 7/2001 | | |
| WO | 2016166384 A1 | | 10/2016 | | |
| WO | WO 2016/166384 A1 | * | 10/2016 | ............ | B01D 53/26 |

OTHER PUBLICATIONS

JPH0957045A_English (Year: 1997).*
WO 2016/166384 A1_English (Year: 2016).*
JP2001206429_English (Year: 2001).*
May 3, 2017—(WO) International Search Report—App PCT/ES2016/070820.
May 3, 2017—(WO) Written Opinion of the International Searching Authority—App PCT/ES2016/070820.

* cited by examiner

RECHARGEABLE DEHUMIDIFIER

The present application is a U.S. National Phase Application under 35 U.S.C. § 371 of PCT/ES2016/070820 filed Nov. 17, 2016 which is incorporated by reference herein in its entirety.

TECHNICAL FIELD OF THE INVENTION

This invention lies within the field of dehumidifiers, in particular rechargeable dehumidifiers, comprising a first cavity in which a desiccant agent is provided and a second cavity arranged below the first cavity in order to collect the water absorbed by the desiccant agent.

BACKGROUND OF THE INVENTION

Dehumidifiers are devices that allow absorbing ambient humidity. There are several types: electric, in which a pump extracts the ambient humidity and condenses it into a container; rechargeable, which do not require an electric connection but require a desiccant agent that must be replaced once it becomes saturated, i.e. recharging in order to continue operating.

Rechargeable dehumidifiers are known such as those that the applicant themselves have disclosed in the application for utility model with publication number ES1039679 and the PCT Patent with publication number WO2016166384 in which the dehumidifiers comprise a first cavity wherein a desiccant agent is provided and a second cavity with a transparent portion, said second cavity being arranged below the first cavity in order to collect the water absorbed by the desiccant agent; the mouths of both cavities are facing one another such that they are connected inside so that the water from the first cavity falls by gravity and is collected in the second cavity.

This arrangement of the cavities implies that the configurations of the device must anchor these to one another in a fixed manner in order to configure a stable and relatively sealed assembly so as to prevent spills between the cavities and outside of these.

Therefore, it is common for the bodies forming the cavities, usually called casings for the lower cavity and lid for the upper cavity, have relatively complex configurations, such as lips, burrs for anchoring by clipping, etc. All these configurations involve discontinuities on the surfaces that affect the outward appearance of the dehumidifier, its aesthetics, and complicate its manufacture since they involve dies in moulds or machining or the joining of several parts.

DESCRIPTION OF THE INVENTION

The present invention is established and characterised in the independent claims, while the dependent claims describe additional characteristics thereof.

The subject matter of the invention is a rechargeable dehumidifier that includes inside it the components it consists of, with the possibility that none of these project outward, such that it has an outward appearance without projections, as well as being simple to manufacture. The technical problem to be solved is to configure the components and their arrangement with respect to one another in order to achieve the aforementioned subject matter.

In view of the above, this invention relates to a rechargeable dehumidifier, in the sense that it includes a desiccant agent of any known kind, such as a tablet, a bag with granules, etc.

The dehumidifier comprises a casing with at least one first opening that is open on the top, as a basin, which configures a first internal cavity, a first lid arranged on the casing acts as a closing or covering element for the casing.

The dehumidifier is characterised in that within the first cavity is arranged a vessel which in turn comprises a body that is open at the top which configures a second cavity, a second lid is provided on top of the body and said second lid has at least one second opening that serves as a passage to the second cavity; on the second lid there may be provided a desiccant agent such that the water absorbed from it is collected in the body when it falls by gravity.

One advantage is that by arranging the components inside the outside can be designed as uncluttered as desired, which achieves a minimalist outside appearance, according to current aesthetic tastes.

Another advantage derived from the previous one is that the configuration both of the casing and its lid can be as simple as desired, with straight and smooth walls.

Another advantage derived from the previous one is that the materials of the casing can be difficult to shape into complicated surfaces, and since the configuration can be simple this makes it simple to manufacture even with such materials, as would be the case if the casing were made in a ceramic material.

Other advantages related to features mentioned in the dependent claims are mentioned in the detailed description below.

BRIEF DESCRIPTION OF THE DRAWINGS

This specification is supplemented with a set of drawings illustrating the preferred embodiment, which are never intended to limit the invention.

DETAILED DESCRIPTION OF THE INVENTION

We shall now describe a first and a second embodiment of the invention based on the figures.

Figure 1:
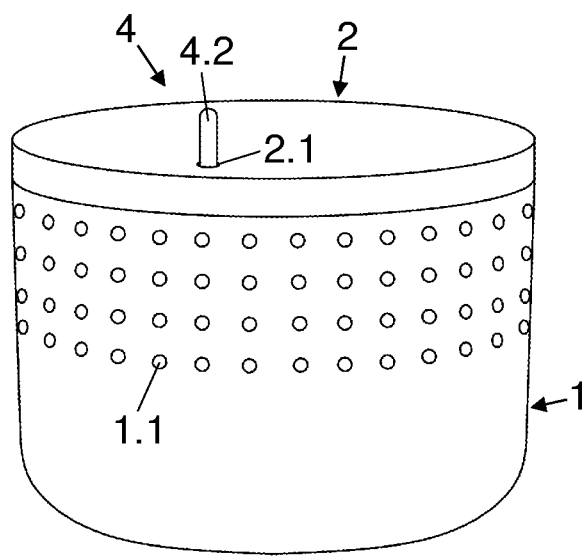
FIG. 1 shows a perspective view of a first embodiment in which the float protrudes from the first lid of the casing.
Figure 2:
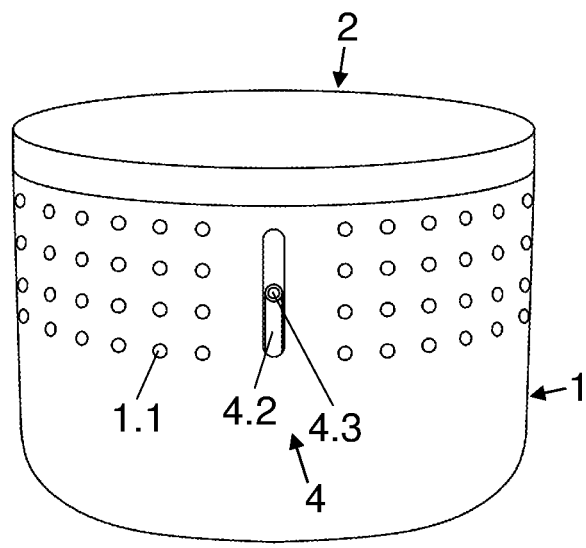
FIG. 2 shows a perspective view of a second embodiment in which the float protrudes from the casing.
Figure 3:
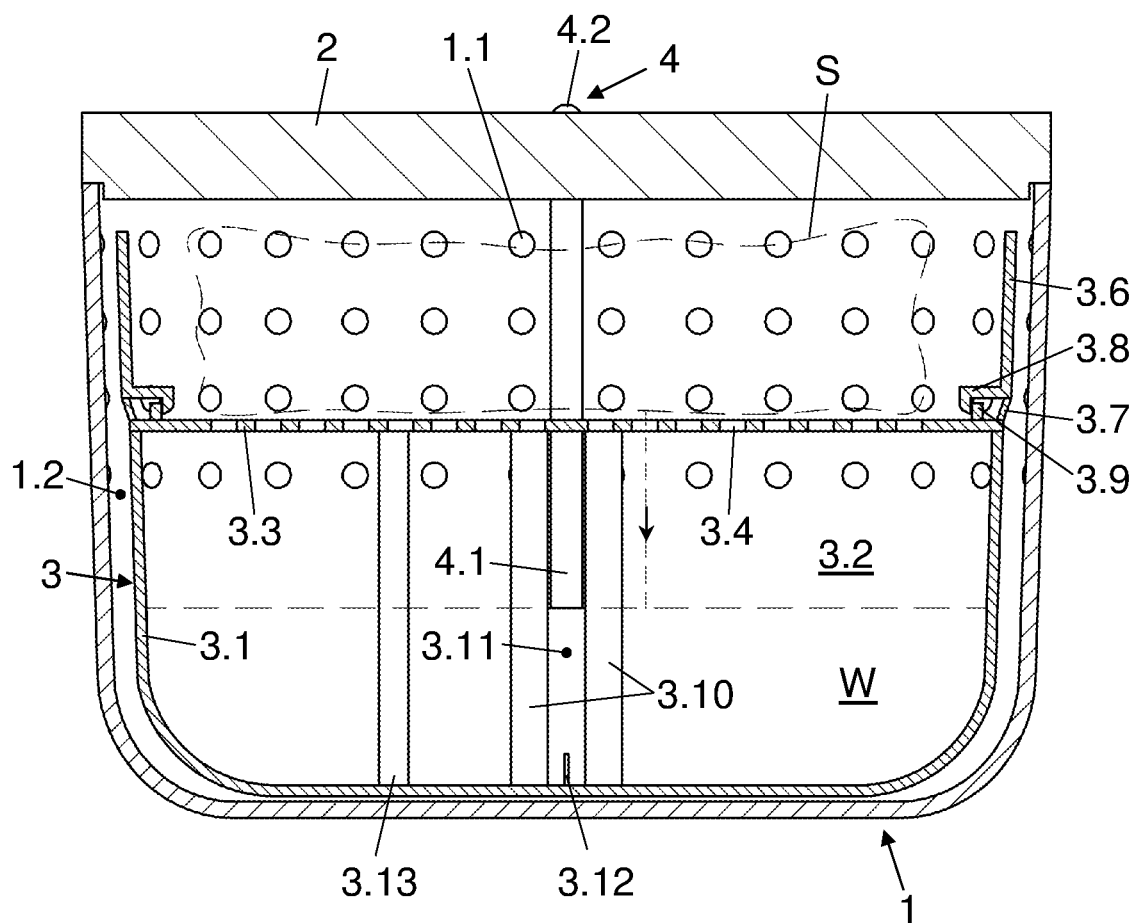
FIG. 3 shows a cross-section of the first embodiment.

FIGS. 1 to 3 show a rechargeable dehumidifier comprising a casing (1) with at least one first opening (1.1), in the embodiment shown these are multiple circular openings although it could also be a single large opening or several openings with other shapes different to that shown, and open on the top; a first lid (2) is arranged on the casing (1). FIG. 3 shows details of the internal components of the casing (1), such that they configure a first internal cavity (1.2), wherein a container (3) is provided that in turn comprises a body (3.1) that is open on the top which configures a second cavity (3.2), a second lid (3.3) is provided on the body (3.1) and has at least a second opening (3.4), which in the embodiment shown are multiple curved slots although it could be a single large slot or several slots with different shapes to the one shown; on the second lid (3.3) may be provided a desiccant agent (S), of any known kind, the one shown being a bag with a desiccant product inside, such that the water absorbed by it is collected in the body (3.1) when it falls by gravity. FIG. 3 shows with a dotted line the level reached by the water collected (W), and a dotted vertical line with an arrow pointing downwards shows as an example how the water passes through a second opening (3.4) to the body (3.1) of the container (3).

Figure 4:
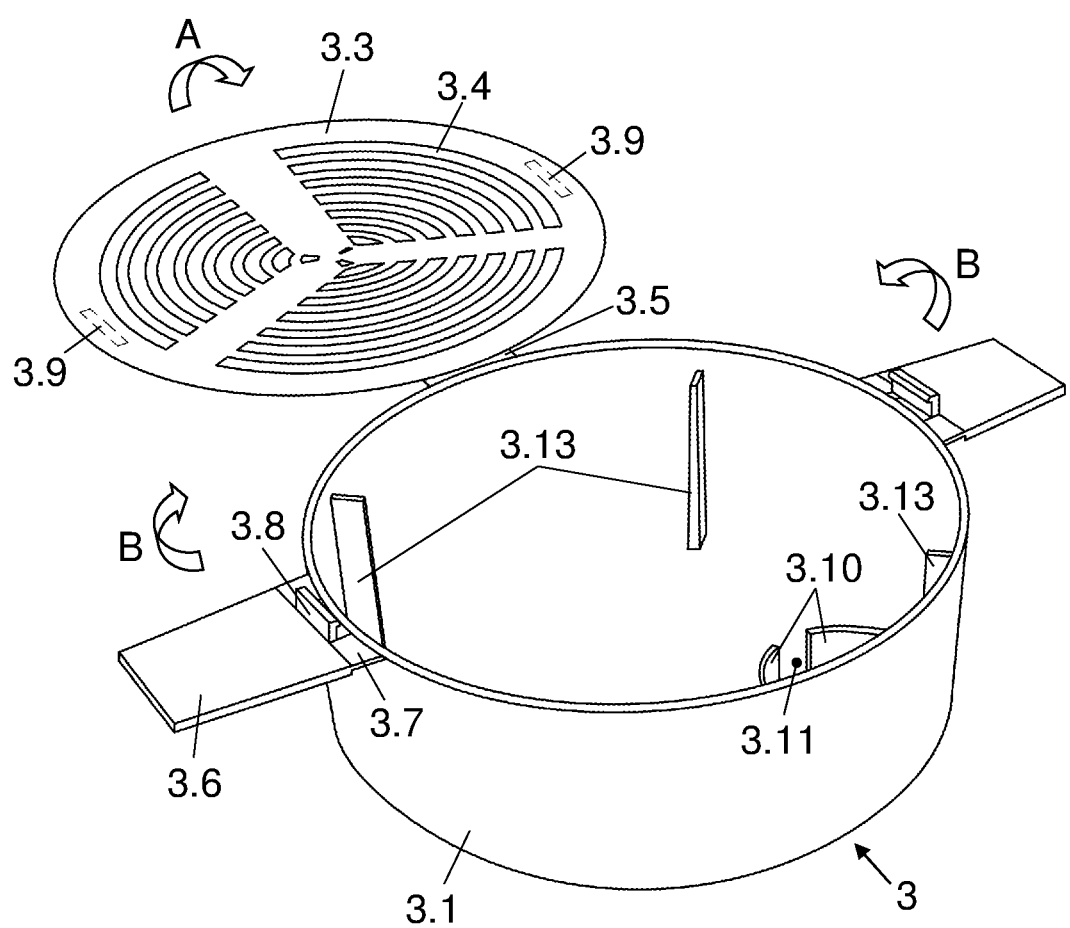
FIG. 4 shows a perspective view of the container with thinner portions acting as hinges on the lid and handles.

FIG. 4 shows the option that a second lid (3.3) is connected to the body (3.1) via a first portion (3.5) that is thinner in order to act as a hinge. This connection shown is an embodiment since it could simply rest on top or be fixed in any other known manner such as glued, welded, with clips, etc. The advantage of this embodiment is that it can be manufactured in a simple manner by injection, especially when made in a plastic material.

FIGS. 3 and 4 show the option that the container (3) has at least one handle (3.6) connected to the body (3.1), which makes it simple to extract, especially when there are at least two handles (3.6) as shown in the figures. In particular, the handle (3.6) is connected to the body (3.1) via a second thinner portion (3.7) that acts as a hinge. Similarly, as mentioned for the second lid (3.3), this connection shown is an embodiment since it could simply be an extension or be fixed in any other known manner, such as glued, welded, etc. The advantage of this embodiment is that it can be manufactured in a simple manner by injection, especially when made in a plastic material.

Another option is for there to be a hook-shaped configuration (3.8) protruding from the handle (3.6), FIGS. 3 and 4, which fits together with a burr (3.9) that projects from the second lid (3.3), FIG. 3.

It is especially advantageous that the second lid (3.3) and each handle (3.6) are connected via the corresponding thinner portions acting as hinges, first (3.5) and second (3.7) respectively, as shown in FIGS. 3 and 4, as well as joining the hook (3.8) that clamps with a burr (3.9). Thus, the full container (3) can be manufactured by injection in a simple manner, especially if it is made in plastic; FIG. 4 shows the part as it would come directly from the injection mould, without the need for slides in the mould, but being unmoulded directly, which makes the manufacture simple and inexpensive. Its assembly is also simple since it is enough to perform a first fold where indicated with the arrow A in FIG. 4 in order to approximate the second lid (3.3) to the body (3.1) and subsequently at a second fold indicated with arrow B approximate each handle (3.6) until each hook (3.8) fits its corresponding burr (3.9).

One option in order to provide a float that indicates the level of water collected is for a body (3.1) in the second cavity (3.2) to have at least one first wall (3.10), FIGS. 3 and 4, in order to configure inside it a housing (3.11), FIG. 4, within which to provide a float (4), FIGS. 1 to 3, 5 and 6, such that it can move vertically within said housing (3.11).

Figure 5:
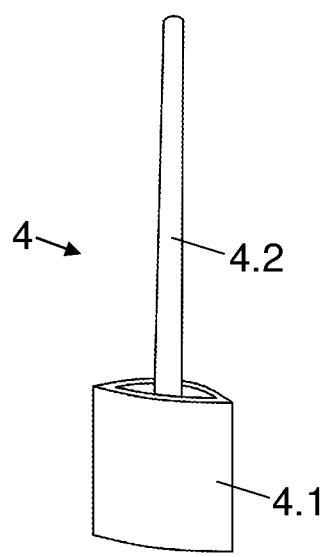
FIG. 5 shows a perspective view of a float with a first post.

In particular, in a first embodiment, FIGS. 1, 3 and 5, the float (4) comprises a float (4.1) that adapts to the inside of the housing (3.11) in order to move within it, with a first post (4.2) projecting from the float (4.1); additionally, the first lid (2) may have an opening (2.1), where the first post (4.2) faces said opening (2.1) such that it can go through it in its vertical movement. This configuration is an option for the user who prefers to have the indication above the dehumidifier, usually depending on stylistic tastes as well as on its location.

Figure 6:
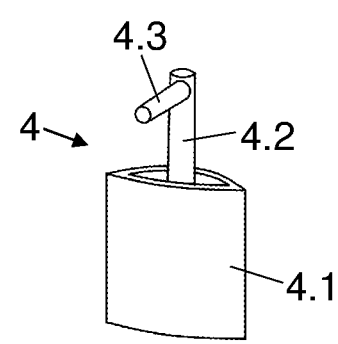
FIG. 6 shows a perspective view of a float with a first and a second post.

In a second embodiment, FIGS. 2 and 6, there is a second post (4.3) projecting crosswise from the first post (4.2); additionally, the casing (1) has a slot (1.2), the second post (4.3) passes through such slot (1.2) and runs across it in its vertical movement. This configuration is an option for the user who prefers to have the indication on one side of the dehumidifier, usually depending on stylistic tastes as well as on its location.

One advantageous option is providing inside the housing (3.11) and on the bottom thereof a stop (3.12), FIG. 3, to support the float (4) when it lies at its lowest position, thus preventing it from becoming stuck in its housing, which is usually smaller at the bottom.

Another option, which serves to provide structural reinforcement, is for the body (3.1) in the second cavity (3.2) to have at least one second vertical wall (3.13) as a reinforcement, FIGS. 3 and 4. In particular it is advantageous for the second vertical walls (3.13) to be three in number and arranged in a star configuration, each occupying at least half the height of the body (3.1), thus making the reinforcement effective and distributed.

Optionally, the casing (1) is made in ceramic material, with the known advantages of durability to humidity and appearance, the container (3) and the float (4) are made in plastic material, with the known advantages of easy manufacture, such as by injection, for example, and corrosion resistance.

The invention claimed is:

1. A rechargeable dehumidifier comprising a casing with at least one first opening and open on the top configuring a first internal cavity, a first lid arranged upon the casing, wherein within the first internal cavity is a container that in turn comprises a body that is open on the top which configures a second cavity, with a second lid provided upon the body and having at least one second opening, on the second lid can be provided a desiccant agent such that the water absorbed by it is collected in the body when it falls by gravity.

2. The rechargeable dehumidifier according to claim 1 wherein the second lid is connected to the body via a first portion that acts as a first hinge.

3. The rechargeable dehumidifier according to claim 1 wherein the container has at least one handle connected to the body.

4. The rechargeable dehumidifier according to claim 3 wherein the handle is connected to the body via a second portion that acts as a second hinge.

5. The rechargeable dehumidifier according to claim 3 wherein from the handle projects a hook-shaped configuration that fits with a burr that projects from the second lid.

6. The rechargeable dehumidifier according to claim 1 wherein the body in the second cavity has at least one first wall in order to configure inside it a housing within which is provided a float such that it can move vertically within said housing.

7. The rechargeable dehumidifier according to claim 6 wherein the float comprises a float bar that adapts to the inside of the housing in order to move within it, with a first post projecting from the float bar.

8. The rechargeable dehumidifier according to claim 7 wherein the first lid has an opening, the first post faces said opening such that it passes through it in its vertical movement.

9. The rechargeable dehumidifier according to claim 7 wherein a second post projects crosswise from the first post.

10. The rechargeable dehumidifier according to claim 9 wherein the casing has a slot therein and the second post projects through the slot through which it the second post can pass in its vertical movement in said slot.

11. The rechargeable dehumidifier according to claim 6 wherein inside the housing and in its lower section is provided a stop to support the float when it rests in its lowest position.

12. The rechargeable dehumidifier according to claim 1 wherein the body in the second cavity has at least one second vertical wall as a reinforcement.

13. The rechargeable dehumidifier according to claim 12 wherein the second vertical walls are three bars arranged in a configuration each occupying at least half of the height of the body in the second cavity.

14. The rechargeable dehumidifier according to claim 6 wherein the casing is made in a ceramic material, and the container and the float are made in plastic material.

* * * * *